Patented Dec. 20, 1949

2,491,472

UNITED STATES PATENT OFFICE 2,491,472

POLYMERIZATION OF VINYLPYRIDINES

Jesse Harmon, Wilmington, Del., assignor to E. I. du Pont de Nemours & Company, Wilmington, Del., a corporation of Delaware No Drawing. Application January 7, 1948, Serial No. 1,051

10 Claims. (Cl. 260—88.3)

This invention relates to the polymerization of vinylpyridines and, more particularly, to the polymerization of an aqueous solution of salts of vinylpyridines.

Polymers of vinylpyridines have been made by various methods including bulk, solution, and emulsion polymerization of the monomeric base. The polymers made by such methods often have a gel-like or rubber-like character and it is difficult to purify them and remove occluded polymerization catalysts, emulsifying agents, unpolymerized monomer, etc.

An object of this invention is to provide a new method of polymerizing vinylpyridines. A further object is to provide a method of making vinylpyridine polymers which are substantially free from impurities. A still further object is to provide such a method which can be practiced on a large commercial scale. Still other objects will be apparent from the following description of the invention.

The objects of this invention are accomplished by the new process described herein which comprises polymerizing in aqueous solution a salt of a monomeric vinylpyridine derived from said vinylpyridine and an acid having a dissociation constant of at least $1.49 \times 10^{-4}$. The salts are then neutralized and the resulting polymeric base is filtered and washed.

In a more restricted and preferred embodiment of the invention an aqueous solution of a mineral acid salt of a monomeric vinylpyridine is polymerized in the presence of peroxygen compound catalyst at a temperature of 20° to 100° C. until the desired degree of polymerization has been attained. An especially useful class of polymers is made by carrying out the reaction until the polymeric salts can be converted to polymeric vinylpyridine bases which are insoluble in water but soluble in aqueous acetic acid of about 1% concentration. The polymeric salt is converted to a free polymeric base which is washed free from impurities.

The monomeric vinylpyridine salts are suitably prepared, preferably in aqueous solution, by treating the basic vinylpyridine monomer with at least a chemically equivalent amount of acid; for example, 1.0 to 3.0 chemical equivalents of acid per mol of vinylpyridine. Excesses of up to 200% over the chemically equivalent amount required are especially useful where polyvinylpyridine solutions of increased viscosity are desired. For example, the viscosities of 1% methanol solutions of polyvinylpyridine obtained from this excess acid procedure are increased to over five-fold over those of the corresponding solutions of polyvinylpyridine prepared with chemically equivalent amounts of acid. The aqueous solution of vinylpyridine salt, preferably of 30% to 50% concentration, is then subjected to polymerization conditions, preferably in the presence of a peroxygen compound catalyst. The latter can be used in varying amounts in excess of 0.01%, but about 1% by weight of the basic vinylpyridine monomer employed is generally suitable for a practical process. In general, less than 5% catalyst will be used, the preferred amount being between 0.1% to 1%.

The salt solution of the polymer may be used as such after filtering from insoluble materials, or the free polymeric base (which is usually in granular form) can be obtained by precipitation with alkaline neutralizing agents, followed by filtration, washing with water, and drying.

The invention is illustrated by the following examples in which parts, unless otherwise specified, are by weight.

*Example I*

A solution of 2-vinylpyridine hydrochloride was prepared by dissolving 90 parts of 2-vinylpyridine in 210 parts of 15% aqueous hydrochloric acid at 20° to 25° C. Ammonium persulfate (0.9 part) was dissolved in the monomer salt solution. Air was driven out of the reaction vessel with nitrogen and it was then loosely covered and stored at 50° C. Within a period of 1.5 hours the solution had become quite viscous and at the end of 40 hours heating at this temperature it was clear, slightly amber colored, and very viscous. This salt solution of the polymer was diluted with an equal volume of water and neutralized with an excess of 10% sodium bicarbonate solution whereby the basic poly-2-vinylpyridine was precipitated. It was filtered, washed with water, and dried under reduced pressure (50 mm.) over concentrated sulfuric acid. The dried poly-2-vinylpyridine so obtained was a gray-white, semi-fused, horn-like solid, insoluble in water, soluble in methanol and acetic acid. The yield amounted to 89% of the theoretical amount. This poly-2-vinylpyridine being free from impurities is commercially well-suited as the film-forming binding agent for the antihalation layer of a photographic film.

It is not essential that the polymerization be conducted in the presence of an inert gas as yields of approximately 90% of satisfactory polyvinylpyridines can be obtained by the following procedure.

Example II

Distilled 2-vinylpyridine monomer was dissolved in an equivalent amount of concentrated hydrochloric acid and the solution was cooled to 25° C. After dilution with water (2 parts of water per part of monomer) and addition of 1% ammonium persulfate (based on the weight of vinylpyridine monomer), the mixture was heated at 50° C. until polymerization was substantially complete (17 to 24 hours). The polymeric base was isolated as in Example I, washed and dried at 50° C.

The viscosity of a 1% methanol solution of this dried polyvinylpyridine as determined in a Höppler viscosimeter (tube No. 128, glass ball No. 1) was found to be 0.67 centipoise. When 1.25 and 2.00 chemical equivalents of hydrochloric acid per mol of monomeric vinylpyridine were employed in the above process, the corresponding viscosities of 1% methanol solutions of the resulting polyvinylpyridines, obtained in yields of approximately 90%, were found to be 1.24 and 1.22 centipoises, respectively. Omission of the polymerization catalyst in the above procedure, using 1.25 chemical equivalents of hydrochloric acid per mol of monomeric 2-vinylpyridine, resulted in a yield of only 16.2% of the polyvinylpyridine.

Example III

The sulfate of 2-vinylpyridine also polymerizes satisfactorily under the same catalytic polymerizing conditions employed for the hydrochloride in the preceding example. This salt can be prepared by dissolving the 2-vinylpyridine monomer in 20% sulfuric acid while maintaining the temperature below 25° C. To such a salt solution made from 1 mol of the vinylpyridine and 0.62 mol of sulfuric acid was added ammonium persulfate (1% based on the weight of the monomer). Polymerization was then effected by heating at 50° C. for about 18 hours and the poly-2-vinylpyridine base was precipitated with 5% aqueous sodium hydroxide solution. It was filtered, washed sulfate free and dried at 50° C.

The viscosity of a 1% methanol solution of this dried polyvinylpyridine determined as described in Example II was 0.75 centipoise. When 2.00 and 2.50 chemical equivalents of sulfuric acid per mol of vinylpyridine monomer were employed in the procedure above, the corresponding viscosities of 1% methanol solutions of the resulting polyvinylpyridines were found to be 1.46 and 2.52 centipoises, respectively.

Example IV

Employing a procedure similar to the above, a 10% aqueous solution of 2-vinyl-5-ethylpyridine hydrochloride containing 1% by weight of the vinylpyridine of ammonium persulfate was stored under nitrogen at room temperature for 24 hours. The resulting jelled composition after dilution with approximately a four-fold volume of water was filtered and the viscous filtrate was coagulated with caustic soda to give a basic polymeric 2-vinyl-5-ethylpyridine. This product was wshed and dried as described in Example I and had properties similar to the polymer of that example.

Example V

The hydrochloride of 2-methyl-5-vinylpyridine which was prepared by substituting equivalent amounts of 2-methyl-5-vinylpyridine for the 2-vinylpyridine of Example I was polymerized, precipitated, and recovered under the conditions of Example II and a good yield of a solid polymer of 2-methyl-5-vinylpyridine was obtained. It had similar properties to the polymer of Example I.

Vinylpyridine polymers which can be prepared by the process of this invention include those from the alpha-, beta-, or gamma-vinylpyridines and homologs thereof containing an alkyl radical of 1 to 4 carbon atoms attached to an annular carbon atom of the pyridine ring. Because of their accessibility, it is preferred to employ vinylpyridines containing not more than a total of nine carbon atoms including alpha-, beta-, and gamma-vinylpyridines and their methyl and ethyl ring-substitution products. Mixtures of two or more of any of the herein disclosed salts can be used if desired. In addition, there may be admixed to form copolymers other polymerizable vinyl or vinylidene compounds having a single vinylidene group ($CH_2=C<$), e. g., styrene, acrylonitrile, methacrylonitrile, acrylic and methacrylic esters and amides. Those copolymers which are soluble in 1% aqueous acetic acid which contain not more than 20% of the above copolymerizable materials are preferred.

The vinylpyridine salts employed in the process of this invention may be derived from both organic and inorganic acids which have a dissociation constant of at least $1.49 \times 10^{-4}$. It has been found that with acids, e. g., acetic acid, of dissociation constants below this figure very little polymerization occurs under the conditions set forth above.

Suitable acids include glycolic, bromoacetic, alpha-bromopropionic, chloroacetic, dichloroacetic, trichloroacetic, formic, hydrochloric, phosphoric, sulfuric, etc. The mineral acids, however, are preferred because, aside from their cheapness, the mineral acid salts of vinylpyridines usually give purer polymeric products. The amount of these acids employed should be at least in stoichiometric amount to the basic monomeric vinylpyridine although an excess may be used. Preferably about 1.25 to 2.0 chemical equivalents of the acid to each mol of the vinylpyridine is employed.

Other peroxygen compound catalysts aside from that illustrated in the examples include hydrogen peroxide; sodium peroxide; the diacyl peroxides, for example, dibenzoyl and dilouryl peroxide; dialkyl peroxides, for example, diethyl peroxide, di(tertiarybutyl) peroxide; persulfates, such as sodium persulfate, potassium persulfate, ammonium persulfate, and the like.

Various neutralizing agents can be used in place of the sodium carbonate and sodium hydroxide which are described in the above examples to neutralize the excess acid and to precipitate the free polymeric base. The agents should have a basicity stronger than that of the vinylpyridine polymer formed in order to remove the acid which is added onto the nitrogen atoms of the polymer. The bases may be organic or inorganic. Additional neutralizing agents include dimethylamine and piperidine, potassium carbonate and potassium hydroxide.

While it is preferred to conduct the polymerization in water alone, the polymerization can also be carried out in a mixture of water and a water-soluble organic solvent, such as methyl, ethyl, propyl, butyl, and isobutyl alcohols; a ketone, such as acetone, methylethyl ketone, methyl isobutyl ketone. Mixture of water and water-miscible alcohols and ketones can also be used. Depending to a large extent on solubility and molecular weight desired, the concentration of the vinylpyridine salt solutions in which polymerization is conducted can vary from 5% to 60%, although it is, in general, preferred to use from 30% to 50% solutions since these concentrations, particularly in aqueous solutions, give the most satisfactory polymers.

The process of this invention is capable of being operated at either room temperature or at slightly elevated temperature, e. g., from 20° C. to 100° C. Preferably, however, the process is operated at a temperature within the range of from 20° C. to 50° C. and under an atmosphere of an inert gas. The time of the reaction varies, of course, with the temperature, particular salt, and catalyst. It may vary from 2 to 90 or more hours. A preferred period is 20 to 80 hours.

The free polymeric base can be precipitated from the polymeric salt solution by treatment with alkaline neutralizing agents, such as aqueous sodium hydroxide, potassium hydroxide, sodium carbonate, sodium bicarbonate solution, and the like. A 5 to 10% concentration of such agents is sufficient but higher concentrations can be used. They are preferably employed in slight excess to the amount of acid present. The precipitated resin is then filtered, washed, and dried by conventional means.

Because the polymeric vinylpyridines produced by this process are, in general, granular and readily soluble in the common organic solvents, described above, they are emininently well-suited for purification, thus eliminating the necessity for expensive rolling equipment required for washing rubbery, cohesive masses. The purified vinylpyridine polymers prepared by the process of this invention being free from undesirable impurities such as monomers, polymerization catalysts, emulsifying agents, etc., are particularly useful in the commercial manufacture of layers in photographic elements including removable anti-halation layers as disclosed in applications Serial Numbers 687,708 and 687,709, filed August 1, 1946, now U. S. Patents 2,448,542 and 2,448,507, respectively. They are readily applied from organic solvents, such as alcohols, e. g., methyl alcohol, the layers being conveniently removable in acid developing baths commonly employed in photographic film processing.

As many widely different embodiments of this invention can be made without departing from the spirit and scope thereof, it is to be understood that the invention is not to be limited except as defined by the claims.

What is claimed is:

1. The process which comprises polymerizing in aqueous solution a salt of a monomeric vinylpyridine with an acid having a dissociation constant of at least $1.49 \times 10^{-4}$.

2. The process which comprises polymerizing in aqueous solution an addition salt of a monomeric vinylpyridine with an acid having a dissociation constant of at least $1.49 \times 10^{-4}$ in the presence of a peroxygen compound catalyst, precipitating a polymeric vinylpyridine by the addition of a neutralizing agent, filtering the precipitated polymer, and washing the latter.

3. The process which comprises polymerizing in aqueous solution an addition salt of a monomeric vinylpyridine having 7 to 9 carbon atoms with an acid having a dissociation constant of at least $1.49 \times 10^{-4}$ by maintaining said solution at a temperature of from 20 to 100° C. for a period of 2 to 90 hours and under the atmosphere of an inert gas.

4. The process which comprises polymerizing in aqueous solution an addition salt of a monomeric vinylpyridine having 7 to 9 carbon atoms with an acid having a dissociation constant of at least $1.49 \times 10^{-4}$ in the presence of a peroxygen compound catalyst, precipitating a polymeric vinylpyridine by the addition of an alkaline neutralizing agent, filtering the precipitated polymer, and washing the latter.

5. The process which comprises polymerizing in aqueous solution a salt of a monomeric unsubstituted vinylpyridine with an acid having a dissociation constant of at least $1.49 \times 10^{-4}$ by maintaining said solution at a temperature of from 20 to 100° C. for a period of 2 to 90 hours and under the atmosphere of an inert gas.

6. The process which comprises polymerizing in aqueous solution an addition salt of a monomeric unsubstituted vinylpyridine with an acid having a dissociation constant of at least $1.49 \times 10^{-4}$ in the presence of a peroxygen compound catalyst, precipitating a polymeric vinylpyridine by the addition of a neutralizing agent, filtering the precipitated polymer, and washing the latter.

7. The process which comprises polymerizing in aqueous solution 2-vinylpyridine hydrochloride at a temperature of 20° C. to 100° C. in the presence of a peroxygen compound for a period of 20 to 80 hours, adding a neutralizing agent to precipitate poly-2-vinylpyridine, and washing such precipitate.

8. A process as set forth in claim 7 wherein the polymerization is carried out until a poly-2-vinylpyridine is formed which is water-insoluble but soluble in 1% aqueous acetic acid.

9. The process which comprises polymerizing in aqueous solution 2-vinylpyridine sulfate at a temperature of 20° C. to 100° C. in the presence of a peroxygen compound for a period of 20 to 80 hours, adding a neutralizing agent to precipitate poly-2-vinylpyridine, and washing such precipitate.

10. The process which comprises polymerizing in aqueous solution the hydrochloride salt of a 2-vinylpyridine containing a methyl substituent in the pyridine ring at a temperature of 20° C. to 100° C. in the presence of a peroxygen compound catalyst for a period of 20 to 80 hours, adding a neutralizing agent to precipitate the poly-2-vinylpyridine methyl derivative, and washing such precipitate.

JESSE HARMON.

No references cited.